United States Patent [19]
Klingelhöfer et al.

[11] 4,025,109
[45] May 24, 1977

[54] FITTING FOR ADJUSTABLY CONNECTING A BACKREST MEMBER TO A SEAT MEMBER

[75] Inventors: Gerd Klingelhöfer; Paul Werner, both of Remscheid, Germany

[73] Assignee: Firma Fritz Keiper, Remscheid-Hasten, Germany

[22] Filed: Jan. 19, 1976

[21] Appl. No.: 650,233

Related U.S. Application Data

[63] Continuation of Ser. No. 471,256, May 20, 1974, abandoned.

[30] Foreign Application Priority Data

May 23, 1973  Germany .................... 2326223

[52] U.S. Cl. .................... 297/355; 16/139; 297/362; 297/366
[51] Int. Cl.² .................... A47C 1/027; B60N 1/06
[58] Field of Search .......... 297/355, 362, 366–372, 297/378, 379; 16/139, 140, 144

[56] References Cited

UNITED STATES PATENTS

| | | | |
|---|---|---|---|
| 3,401,979 | 9/1968 | Putsch | 297/362 |
| 3,423,785 | 1/1969 | Pickles | 16/140 |
| 3,471,892 | 10/1969 | Resag et al. | 16/139 |
| 3,479,088 | 11/1969 | Bonnaud | 297/366 X |
| 3,511,534 | 5/1970 | Turner | 297/366 X |
| 3,667,804 | 6/1972 | Yasui et al. | 297/366 X |
| 3,719,387 | 3/1973 | Boschen et al. | 297/379 |
| 3,731,342 | 5/1973 | Cousin | 297/379 X |
| 3,823,440 | 7/1974 | Klingelhofer | 16/139 |

*Primary Examiner*—Roy D. Frazier
*Assistant Examiner*—William E. Lyddane
*Attorney, Agent, or Firm*—Michael J. Striker

[57] ABSTRACT

A first mounting member can be secured to a backrest member of a seat, such as a seat of an automotive vehicle, and a second mounting member can similarly be secured to the seat member of the seat. A ring gear is provided on one of the mounting members and has inwardly directed teeth, and the other mounting member has a spur gear received within the ring gear and having outwardly directed teeth which mesh with play with the inwardly directed teeth. The spur gear has an outer diameter smaller than the root diameter of the ring gear by at least the height of one tooth and the number of inwardly directed teeth is different from the number of outwardly directed teeth by at least one. An eccentric arrangement is provided, extending through the gears and being movable to and from a position in which it effects relative radial displacement of the gears to such an extent as to eliminate the aforementioned play.

17 Claims, 7 Drawing Figures

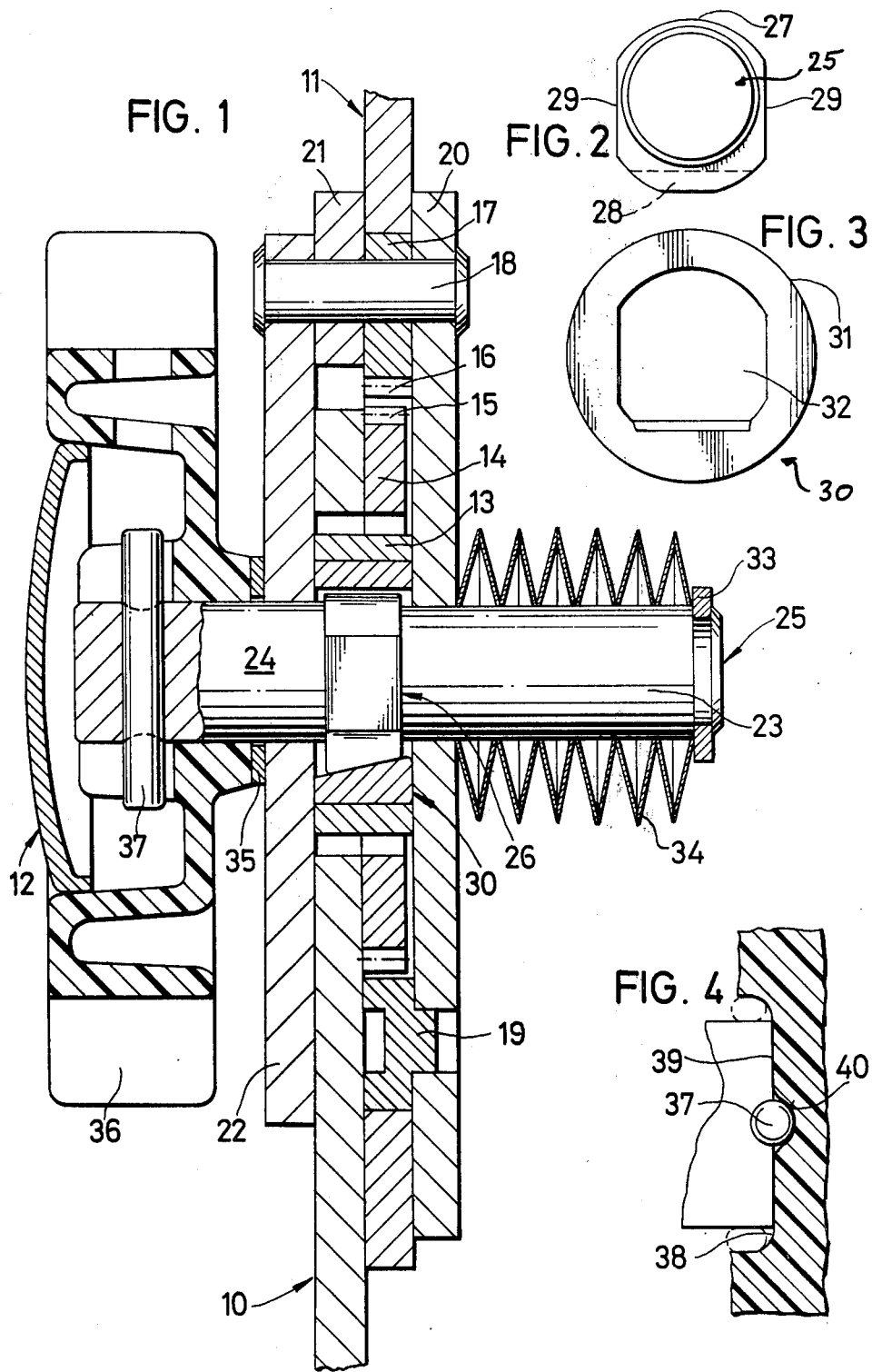

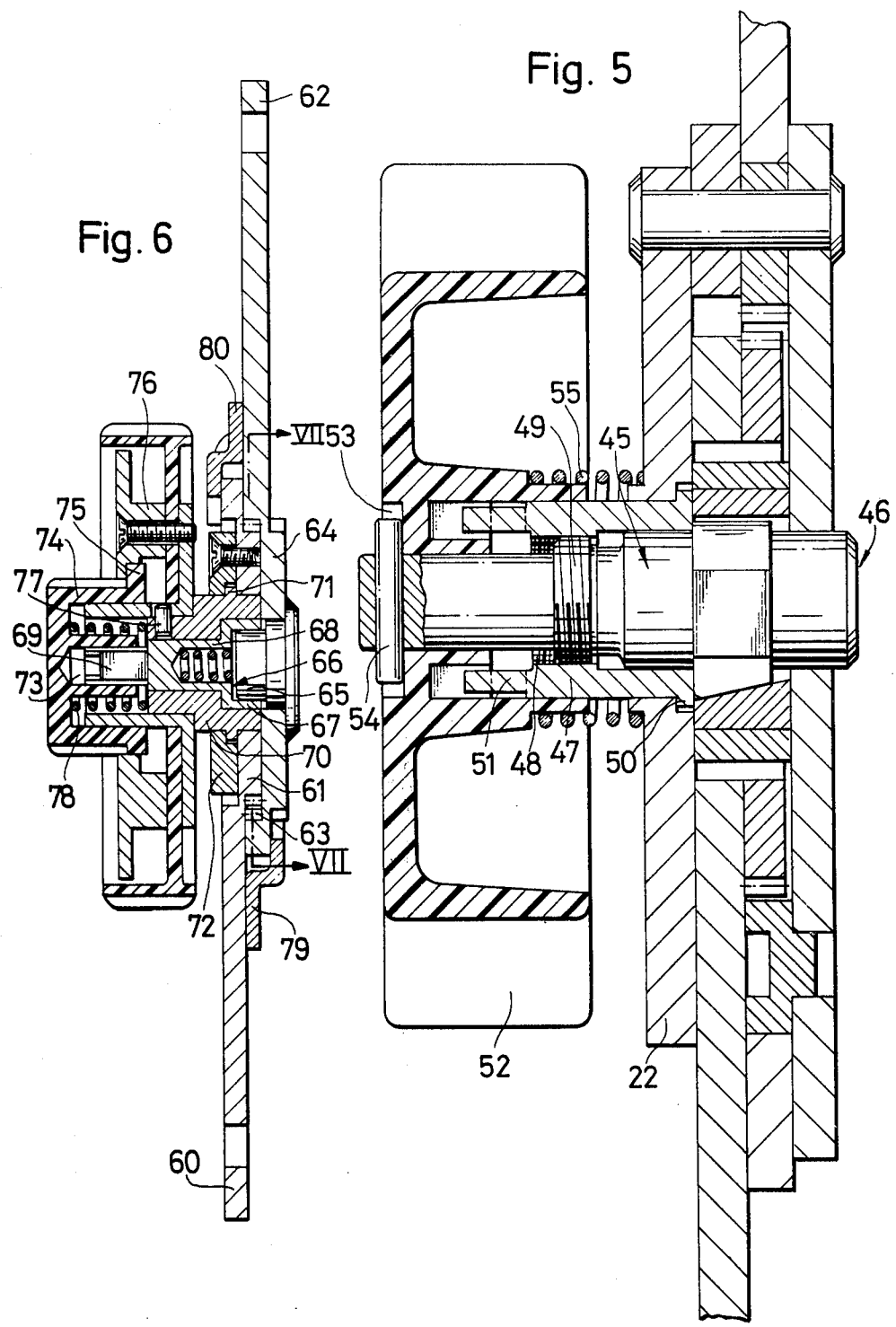

FITTING FOR ADJUSTABLY CONNECTING A BACKREST MEMBER TO A SEAT MEMBER

This is a continuation of application Ser. No. 471,256, filed May 20, 1974, now abandoned.

BACKGROUND OF THE INVENTION

The present invention relates to a seat construction in general, and more particularly to a fitting for adjustably connecting a backrest member to a seat member of a seat, especially a seat of an automotive vehicle.

The use of seats, particularly those in automotive vehicles, wherein the backrest can be adjusted forwardly or backwardly with reference to the seat cushion in order to accommodate the seat to the preferences of a user, is becoming more and more popular. It is known from the prior art to provide a fitting for connecting the backrest member to the seat cushion or seat member, which makes such adjustment possible. This known fitting comprises a ring gear mounted on the backrest member or on the seat member, and a spur gear accommodated within the ring gear and mounted on the other of the members, that is either the seat member or the backrest member. The outer diameter of the spur gear is smaller than the root diameter of the ring gear by at least the height of one tooth, and the number of teeth on the ring gear and on the spur gear differs by at least one.

This construction has the advantage that even in the event of extreme stresses acting upon the backrest member, there can be no unintentional disengagement of the teeth of the spur gear and the ring gear, and hence unintentional displacement of the backrest member, since such disengagement is possible only when a mechanism is utilized which is a part of the prior-art fitting and which must be specifically operated in order to disengage the teeth of the two gears from one another so that one gear can turn with reference to the other. However, in order to be able to operate this prior-art construction with ease it is necessary that a certain amount of play exist between the teeth of the spur gear and the meshing teeth of the ring gear which, when the backrest member is to be moved relative to the seat member will be in rolling engagement with one another as one of the gears turns with reference to the other. Given the fact that these gears are not usually made to very exacting tolerances, for economic reasons, the amount of play has been found in some instances to be relatively substantial. This will then have the result that, due to vibrations of the vehicle when the latter is in motion, there will be a chattering of the gears, and the backrest member may actually be visibly movable as a result of external forces, for instance when pressure is exerted upon it.

SUMMARY OF THE INVENTION

As the aforementioned factors evidently constitute disadvantages which are undesirable, it is a general object of the present invention to avoid these disadvantages.

More particularly, it is an object of the present invention to provide a fitting of the type in question which can be produced economically, permits ease of adjustment of the backrest member with reference to a seat member, but avoids the disadvantages outlined above.

More particularly, it is an object of the invention to provide such a fitting wherein the chattering and undesired movements which have been described above, are eliminated.

In keeping with the above objects, and with others which will become apparent hereafter, one feature of the invention resides in a fitting for adjustably connecting a backrest member to a seat member of a seat, especially a seat of an automotive vehicle, comprising a first mounting member adapted to be secured to the backrest member, and a second mounting member adapted to be secured to the seat member. A ring gear is provided on one of the mounting members and has inwardly directed teeth, and a spur gear is provided on the other of the mounting members and is received within the ring gear. The spur gear has outwardly directed teeth which mesh with play with the inwardly directed teeth of the ring gear and its outer diameter is smaller than the root diameter of the ring gear by at least the height of one tooth. The number of inwardly directed teeth is different from the number of outwardly directed teeth by at least one. Eccentric means is provided in accordance with the present invention, extending through the gears and being movable to and from a position in which it effects relative radial displacement of the gears to an extent sufficient to eliminate the play between the teeth of the gears.

In other words, the present invention makes it possible at the will of a user to either permit play between the teeth of the cooperating gears, so as to assure ease of operation when the fitting is to be operated in a sense adjusting the backrest member with reference to the seat member, and when such adjustment is completed the user can then eliminate the play between the gears and thus avoid the disadvantages of the prior art. Once the play is eliminated the teeth of the two gears, which are in mesh with one another, are firmly supported by their interengagement and any chattering or undesired relative displacement is impossible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is an axial section through a first embodiment of the invention;

FIG. 2 is an end view of a component of FIG. 1;

FIG. 3 is an end view of a further component of FIG. 1;

FIG. 4 is a somewhat diagrammatic developed fragmentary sectional view, showing a detail of FIG. 1;

FIG. 5 is a view similar to FIG. 1 but illustrating a second embodiment of the invention;

FIG. 6 is a view also similar to FIG. 1 but illustrating a third embodiment of the invention.

DESCRIPTION OF THE PREFERRED EMBODIMENTS

Figure 7:
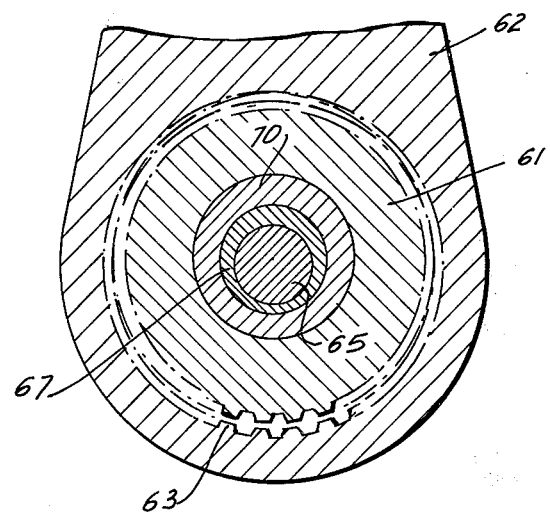
FIG. 7 is a section on line VII—VII of FIG. 6.

FIGS. 1–4 show a first embodiment of the invention. For the sake of convenience the backrest member and the seat member of a seat with which the fitting according to the present invention is to be used, have not been illustrated. However, such an illustration is not believed to be necessary since there certainly can be no doubt as to what constitutes the seat member and the backrest member of a seat.

In FIGS. 1–4, reference numeral 10 identifies a mounting portion which is to be connected with the seat member of a seat; reference numeral 11 identifies a mounting portion which is to be connected with the backrest portion of the same seat, and reference numeral 12 identifies an actuating device or turning means which is to be used when the fitting of the invention is to be operated so as to permit tilting of the backrest member with reference to the seat member.

The mounting portion 10 is provided with a cutout formed with teeth; an externally toothed sleeve 13 is press-fitted into this cutout to mesh with the teeth thereof. On an axially projecting portion the sleeve 13 carries a spur gear or spur gear element 14 which has inner teeth and also outer teeth 15 and which is located in the opening of an annular ring gear 17 having inwardly directed teeth 16. The outer diameter of the spur gear 14, that is of the teeth 15 thereof, is smaller by at least the height of one tooth than the root diameter of the teeth 16 of the ring gear 17. The number of teeth 15 differs from the number of teeth 16 by at least one. The spur gear 16 is of course coupled with the mounting portion 10 by means of the sleeve 13, and when relative pivoting movement between the portions 10 and 11 occurs, the teeth 15 of the spur gear 14 roll circumferentially along the teeth 16 of the ring gear 17. The mounting portion 11 is turnable on the outer circumferential surface of the ring gear 17 in the illustrated embodiment, and coupling means (not illustrated) can be provided for connecting the two so that they cannot turn relative to one another. If desired, the teeth 16 could also be formed directly on the mounting portion 11 itself, which would then in effect constitute the ring gear.

A support plate 20 engages the right-hand side (in FIG. 1) of the ring gear 17, being connected with the latter by rivets 18 (or analogous means) and a projection 19. The rivets 18 are long enough to pass additionally through a segment-shaped planar spacing member 21 which in turn is abutted by an additional support plate 22 which is also held in place by the rivets 18. Because of the presence of the spacing member 21 there is a gap between the plate 22 and the ring gear 17, and in this gap the mounting portion 10 extends in pivotable relationship. The spur gear 14 is connected with the mounting portion 10, as previously pointed out.

As the drawing shows especially clearly in FIG. 1, the plates 20 and 22 are formed with bores which are concentric with the annulus of teeth 16 and which turnably accommodate respective axially aligned shaft portions 23 and 24 of a shaft 25. The latter is also formed with a collar or eccentric means 26 intermediate the shaft portions 23 and 25, and FIG. 2 shows that the collar 26 is bounded by a curved surface portion 27, a planar surface portion 28 located opposite the surface portion 27 and being inclined with reference to the longitudinal axis of the shaft 25 (compare FIG. 1), and two parallel planar guide faces 29 which extend normal to the surface portion 28. An eccentric sleeve 30 surrounds the collar 26 and the end view of the sleeve 30 which is shown in FIG. 3 shows that the sleeve is formed with a cylindrical outer surface 31 and with a central opening 32 which is so configurated that it can non-rotatably engage the collar of the shaft 25, and in particular the side faces 29 thereof, and can also provide for axial displacement in conjunction with the surface portion 28.

The sleeve 30 is prevented from moving axially by the presence of the plates 20 and 22, but it can turn in rotation. Because of the configuration of the associated components, the circumferential surface 31 of the sleeve is eccentric with reference to the central longitudinal axis of the shaft 25 when the collar 26, which is axially shiftable in the sleeve 30, is located in one position within the same. By effecting axial relative displacement of shaft 25 and sleeve 30, the eccentricity can be varied. The basic degree of eccentricity corresponds approximately to the difference between the diameters of the gear tooth annuli 15 and 16, so that when the shaft 25 is turned together with the sleeve 30, the spur gear 14 rolls with its teeth 15 in the teeth 16 of the ring gear 17, thus permitting a pivotal displacement of the portions 10 and 11 (and hence the backrest member relative to the seat member) with reference to one another. Since the difference in the number of teeth of the annulus 15 and 16, respectively, is only small, such as one, the gears have a self-locking action and therefore it is impossible for a once-selected setting to become changed unintentionally.

The self-locking action, however, is already known from the prior art. The purpose of the present invention is to make it possible for the gears 14 and 17 to turn easily with reference to one another when an adjustment is to be made, and to assure — when subsequently the gears are in self-locking position — that the play between the teeth 15 and 16 of the gears — which was required previously to permit such easy adjustment — is eliminated in order to prevent chattering and the other disadvantages outlined earlier with respect to the prior art. This is accomplished according to the present invention by making the shaft 25 axially movable so that, when the gears 14 and 17 have been turned relative to one another to a position at which a desired angle of inclination of the mounting portion 11 with reference to the mounting portion 10 has been selected, the shaft 25 is shifted towards the right in FIG. 1. This causes the eccentricity to be increased due to the presence and operation of the surface portion 28, so that the interengaging teeth 15 and 16 now firmly engage one another without play. For this purpose, a set of dished or Belleville springs 34 surrounds the shaft 25 intermediate an abutment 33 thereon and the plate 20. These springs 34 permanently tend to shift the shaft 25 axially towards the right in FIG. 1; that is they have a permanent tendency to increase the existing eccentricity and thus to prevent play between the teeth 15 and 16. At the opposite side of the arrangement there is provided a knob, handle or the like which is designated with reference numeral 36 and which abuts the outer side of the plate 22 via an interposed washer 35. The hub of the actuating member 36 is formed at the axial side facing away from the plate 22 with a plurality of recesses of different depth (see FIG. 4) which are circumferentially spaced as is evident from the developed view of FIG. 4 and into which a transverse pin or link means 37 which extends out of the portion 24 of the shaft 25, can be received in abutting engagement. One depression is designated with reference numeral 38, having a bottom wall 39 in which there is formed a further depression 40.

It will be appreciated that when the member 36 is turned, and when the pin 37 engages one or the other of the side faces bounding the recess 38 (see the broken line illustration in FIG. 4) the biasing force exerted by the springs 34 is absorbed directly by the plates 20, 22 so that no force is exerted upon the collar 26 in axial direction of the shaft 25. This means that the inherent eccentricity of the arrangement is in use, that is a degree of eccentricity which permits sufficient play between the teeth 15 and 16 to permit easy relative turning of the gears 14 and 17. If, on the other hand, the member 36 is turned, subsequent to the desired adjustment of the gears 14, 17, in a sense opposite to that in which it was previously turned to effect such adjustment, and if this turning continues for a small distance, then the pin 37 can enter into the depression 40 so that the shaft 25 can now perform an axial movement (towards the right in FIG. 1) under the influence of the biasing springs 34. This of course results in a shifting of the collar 26 towards the right, and the inclined surface 28 acts during such shifting to increase the effective degree of eccentricity, and to cause the teeth 15 and 16 to mesh to such an extent that there is no play between them any longer.

If desired, it will be possible to replace the arrangement having the recesses 38, 40 of FIG. 1, by fixedly connecting the member 36 with the shaft 25 and utilizing a member which would replace the washer 35 and which might for instance by displacement, particularly turning, cooperate with appropriately configurated surface portions to be thereby displaced axially when the member 36 is turned, and thus to effect the axial displacement of the shaft 25 counter to the biasing force of the springs 34. This member could for instance be a pivotable arm which in dependence upon its degree of pivoting would cooperate with different surface portions of the plate 22 which would extend outwardly from the free side thereof towards the member 36 and effect the desired axial displacement of the shaft 25 against the force of the springs 34.

FIG. 5 shows a further embodiment of the invention which is to some extent analogous to that of FIGS. 1-4, and wherein those components identical with components of FIG. 1 have not been separately designated. In FIG. 5, however, a sleeve 47 is located between a portion 45 of the shaft 46 which replaces the shaft 25 of FIG. 1, and the plate 22, and in its center region this sleeve 47 has an internal thread 48 which cooperates with a similarly externally threaded portion 49 of the shaft portion 45. At one end the sleeve 47 has a flange 50 which engages the plate 22 so as to prevent the sleeve 47 from axial movement, while permitting it to turn. The other end of the sleeve is provided with axially extending projections 51 which extend in appropriately shaped recesses formed in the hub of a member 52 corresponding to the member 36 of FIG. 1, so that the member 52 can shift axially of the sleeve 47 but not turn relative to it. The member 52 is also provided with radial grooves 53, and the shaft 46 is provided with transverse pins 54 engaging these grooves 53 so that the member 52 can be coupled with the shaft 46. This engagement is maintained by an axially compressed helical spring 55 which bears upon the member 52 and the plate 22, respectively. By depressing the member 52 inwardly (towards the right in FIG. 5) against the force of the spring 55, it can be uncoupled from the shaft 46 but its connection with the sleeve 47 will be maintained, so that it will at all times turn the sleeve 47 when the member 52 is turned.

FIG. 5 shows the member 52 coupled with the shaft 46, and in this position there is a certain play between the teeth 15 and 16 due to the degree of eccentricity which exists at this time. When subsequently it is desired to eliminate this play, the member 52 is pressed inwardly against the force of the spring 55, and when the member 52 is now turned the shaft 46 no longer turns with it, whereas the sleeve 47 does turn with it and the interengagement of the threaded portions or link means 48, 49 results in an axial shifting of the shaft 46 with reference to the axially stationary sleeve 47, thus effecting an increase in the degree of eccentricity and eliminating the play between the teeth 15 and 16. When it is desired later on to re-adjust the relative angular position of the portions 10 and 11, it is necessary first to push the member 52 inwardly and to turn the sleeve 47 until it has been returned to the position in which the original inherent eccentricity is re-established, that is in which play again exists between the teeth 15 and 16, whereupon the re-adjustment in the position of the portions 10 and 11 can be carried out.

FIGS. 6 and 7, finally, show still a further embodiment of the invention which is somewhat simplified with respect to the preceding embodiments. In FIG. 6, a mounting member 60 which is to be connected with the seat member of a seat has a spur gear 61 formed of one piece with it so as to project at one side of the portion 60. The mounting portion 62, which is to be connected with the backrest member of the seat, is formed with an inner annulus 63 of gear teeth, thus constituting the ring gear, and with a wall portion 64. A pin 65 is mounted in the wall portion 64, by welding it to the same or otherwise securing it, so as to be concentric with the annulus 63. A first eccentric member 66 is turnably mounted on the pin 65 and has two coaxial axial portions 67 and 68 of differential diameters, as well as a projection or link means 69 of polygonal section. The bore in which the pin 65 is received is formed slightly eccentrically in the member 66 which latter advantageously bears upon the end of the projection 65 against the resistance of the illustrated spring. A second eccentric member 70 is turnably journalled on the first eccentric member 66, for which purpose it is provided with an internal bore or passage matingly configurated with respect to the external configuration of the member 66. The outer circumferential surface of the member 70 is eccentric with reference to its bore. The member 70 is turnable in a bore of the spur gear 61 and is axially supported by an outer flange 71 which is engaged by a plate 72 that is connected (e.g. by screws) with the spur gear 61. The effective eccentricity can be changed in this embodiment by relative turning of the two eccentric members 66 and 70 with reference to one another.

The projection 69 of polygonal profile is slidably received in a corresponding profiled center cutout or link means 73 of a first operating member 74 which can be coupled — in dependence upon its position — with a second operating member 76 by means of projections 75 which are distributed over its circumference. The member 76 is coupled with the second eccentric member 70 by means of a pin 77. When the member or link means 74 is pressed inwardly against a pre-stressed spring 78, the coupling between the members 74 and 76 which prevents their relative rotation, is disengaged. The engagement of the spur gear 61 with the teeth 63 is maintained by claws 79 and 80 which are connected with the mounting portions 60 and 62.

In normal operation there is sufficient play between the teeth on the spur gear 61 and the teeth 63 to permit the desired easy relative displacement of the gears, and hence of the mounting portions 60 and 62. When a desired position has been reached, by turning the member 74 and consequently also the member 76, the member 74 is pushed inwardly (towards the right in FIG. 6) to become uncoupled from the member 76. This now makes it possible to turn the first eccentric member 66 which has a small degree of eccentricity with reference to the second eccentric member 70, in such a sense that the effective eccentricity composed of the individual eccentricities of the two members 66 and 70 increases; this in turn causes sufficient relative displacement of the gears 61 and 63 so that their teeth are interengaged to the point where no play is possible between them. When a re-adjustment in the positions of the mounting portions 60 and 62 is subsequently desired, it is first necessary to turn the member 74 by itself in order to permit play to be re-established between the teeth of the gears 61, 63 and to re-establish coupling of the members 74 and 76 for joint turning. Thereupon, the members 74 and 76 can be turned to re-adjust the positions of the mounting portions 60 and 62.

It is evident that only some possible embodiments have been illustrated in the present application. The invention by no means is limited to these, nor is the scope of the claim intended to be limited to the illustrated embodiments. Various modifications will offer themselves readily to those skilled in the art, including the possibility that the required relative movements in the fitting according to the present invention could be transmitted via appropriate linkages, such as rods or the like, to a second fitting provided on the same seat, for instance at an opposite side thereof from the fitting which has been illustrated, so that the two fittings would be adjusted simultaneously.

It will be understood that each of the elements described above, or two or more together, may also find a useful application in other types of constructions differing from the types described above.

While the invention has been illustrated and described as embodied in a fitting for adjustably connecting a backrest member to a seat member of a seat, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A fitting for adjustably connecting a backrest part to a seat part of a seat, especially a seat of an automotive vehicle, said fitting comprising: a back-rest mounting member connectable to said backrest part; a seat mounting member connectable to said seat part; a ring gear on one of said members and having a predetermined number of inwardly directed teeth centered on a ring-gear axis; a spur gear on the other of said members inside said ring gear and having a number less than said predetermined number by at least one of outwardly directed teeth centered on a spur-gear axis radially offset from said ring-gear axis; turning means for displacing said spur-gear for orbiting said spur-gear axis about said ring-gear axis with said outwardly directed teeth meshing with said inwardly directed teeth and said spur gear rolling in said ring-gear, whereby the relative angular position of said members is varied by such displacement; and eccentric means for increasing and decreasing the radial offset between said axes while always maintaining at least one of said outwardly directed teeth in mesh with at least some of said inwardly directed teeth.

2. The fitting defined in claim 1 wherein said eccentric means comprises a spur-gear element rotationally carrying said spur gear and defining said spur-gear axis and an adjustment handle rotatable about said ring-gear axis and rotationally linked to said spur-gear axis.

3. the fitting defined in claim 2 wherein said eccentric means further comprises an eccentric element carrying said spur-gear element and itself displaceable to move said spur-gear axis relative to said ring-gear axis.

4. The fitting defined in claim 3, further comprising link means connected between said handle and said eccentric element and effective in a play-adjustment position for coupling said handle to said eccentric means for relative displacement of said axes by means of said handle and effective in a seat-adjustment position for decoupling said handle from said eccentric element for operation of said turning means only by said handle.

5. The fitting defined in claim 4 wherein said spur-gear element is an inner sleeve carried on said one member and having an outer surface defining an intermediate axis offset from said ring-gear axis, said eccentric element being an outer sleeve rotatable on said outer surface of said inner sleeve about said intermediate axis and having an outer surface defining said spur-gear axis, said link means being effective to rotate said sleeves relative to each other.

6. The fitting defined in claim 5 wherein said handle is rotationally linked to one of said sleeves and said link means is linked rotationally to the other of said sleeves and includes a link element rotatable with the other of said sleeves and movable between an engaged position linking said sleeves together for joint rotation and a disengaged position permitting relative rotation of said sleeves.

7. The fitting defined in claim 6, further comprising spring means normally urging said link element into said engaged position.

8. The fitting defined in claim 7 wherein said other sleeve is said inner sleeve and has a polygonal-section axial projection, said link means including a button axially displaceable in said handle and having polygonal-section recess snugly receiving said projection, said button having peripheral radially extending formations and said handle having corresponding radially extending formations engageable only in said engaged position with said formations of said link element for rotationally coupling said handle and said button.

9. The fitting defined in claim 4 wherein said spur-gear element is a sleeve having an outer surface carrying said spur gear and defining said spur-gear axis, said eccentric element being a shaft carried on said one member and defining said ring-gear axis, said link means including a collar of relative to said ring-gear axis non-round section snugly engageable in said sleeve.

10. The fitting defined in claim 9 wherein said shaft is axially displaceable in said sleeve and said collar has a surface inclined relative to said ring-gear axis, said handle being rotationally coupled to said shaft.

11. The fitting defined in claim 10 wherein said shaft is axially displaceable in said sleeve between a loose position with said collar pulled at least partially out of said sleeve but still rotationally coupling said shaft to said sleeve and a tight position pressed tightly into said sleeve and forcing same with its inclined surface into a position corresponding to maximum radial offset between said ring-gear and spur-gear axes.

12. The fitting defined in claim 11 wherein said link means further includes a pin on and transverse to said shaft at said handle and a formation on said handle engageable with said pin in said seat-adjustment position for pulling said collar out of said sleeve and in said play-adjustment position for permitting said collar to tightly into said sleeve.

13. The fitting defined in claim 12, further comprising spring means for pressing said collar tightly into said sleeve.

14. The fitting defined in claim 11 wherein said link means includes a tube axially nondisplaceable relative to said sleeve rotationally coupled to said handle and interfitting threads on said shaft and said tube for axial displacement of said shaft on relative rotation of said shaft and said sleeve.

15. The fitting defined in claim 14 wherein said link means further has a formation rationally coupling said shaft to said handle in said play-adjustment position and permitting relative rotation on said shaft and said handle in said seat-adjustment position.

16. The fitting defined in claim 15 wherein said formation is constituted by a transverse pin fixed on said shaft and by corresponding recesses on said handle.

17. The fitting defined in claim 16 wherein said tube is provided with axially extending fingers and said handle is provided with axially opening recesses each capable of receiving a respective finger.

* * * * *